(12) United States Patent
Choi et al.

(10) Patent No.: US 11,912,120 B2
(45) Date of Patent: Feb. 27, 2024

(54) BATTERY MOUNTING STRUCTURE FOR VEHICLE

(71) Applicants: Hyundai Motor Company, Seoul (KR); Kia Motors Corporation, Seoul (KR)

(72) Inventors: Yong Hwan Choi, Seoul (KR); Yu Ri Oh, Gyeongsangbuk-do (KR); Tae Hyuck Kim, Chungcheongnam-do (KR); Gyung Hoon Shin, Seoul (KR); Hae Kyu Lim, Gyeonggi-do (KR); Ji Woong Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 174 days.

(21) Appl. No.: 17/028,911

(22) Filed: Sep. 22, 2020

(65) Prior Publication Data
US 2021/0331570 A1    Oct. 28, 2021

(30) Foreign Application Priority Data
Apr. 27, 2020   (KR) .......................... 10-2020-0050812

(51) Int. Cl.
| | |
|---|---|
| *H01M 50/209* | (2021.01) |
| *B60K 1/04* | (2019.01) |
| *B60L 58/10* | (2019.01) |
| *B60L 50/60* | (2019.01) |
| *B60K 6/28* | (2007.10) |

(52) U.S. Cl.
CPC ............... *B60K 1/04* (2013.01); *B60L 50/66* (2019.02); *B60L 58/10* (2019.02); *H01M 50/209* (2021.01); *B60K 6/28* (2013.01); *B60Y 2200/91* (2013.01); *B60Y 2200/92* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2018/0029493 A1* | 2/2018 | Kobayashi | ............. B60L 58/21 |
| 2018/0109328 A1* | 4/2018 | Eberhard | ............. H04B 10/806 |
| 2020/0287179 A1 | 9/2020 | Wang et al. | |
| 2020/0343498 A1 | 10/2020 | Schuessler et al. | |
| 2021/0402863 A1* | 12/2021 | Huang | .................... B60L 50/66 |

FOREIGN PATENT DOCUMENTS

| | | |
|---|---|---|
| KR | 2014-0045778 A | 4/2014 |
| KR | 102154361 B1 | 9/2020 |

\* cited by examiner

*Primary Examiner* — Victoria H Lynch
(74) *Attorney, Agent, or Firm* — Fox Rothschild LLP

(57) ABSTRACT

A battery mounting structure for a vehicle is provided to include a case having a first internal member that is disposed to be spaced parallel to an upper side of a lower panel of the case and a second internal member that is disposed perpendicular to the first internal member, and configured to accommodate a plurality of battery modules therein using the first internal member and the second internal member. An outer side member is provided in a shape protruding toward the outside on an outer side of the case. The battery modules are disposed in a stacking direction of battery cells that is parallel to a longitudinal direction of the first internal member.

6 Claims, 8 Drawing Sheets

BATTERY MOUNTING STRUCTURE FOR VEHICLE

CROSS REFERENCE TO RELATED APPLICATION

The present application claims priority to Korean Patent Application No. 10-2020-0050812, filed Apr. 27, 2020, the entire contents of which is incorporated herein for all purposes by this reference.

BACKGROUND

1. Technical Field

The present disclosure relates to a structure for mounting a battery in a hybrid vehicle or an electric vehicle.

2. Description of the Related Art

The market demand for eco-friendly vehicles such as hybrid vehicles and electric vehicles is increasing, and to meet various demands for such eco-friendly vehicles, it is essential to increase an energy capacity of a battery mounted within the vehicles. Therefore, there is a need for a technology capable of securing sufficient durability and safety while mounting the battery at a level capable of providing maximum energy capacity in a limited space of the vehicle.

The contents described as the related art have been provided merely to assist in understanding the background of the present disclosure and should not be considered as corresponding to the related art known to those having ordinary skill in the art.

SUMMARY

An object of the present disclosure is to provide a battery mounting structure for a vehicle capable of providing an energy capacity required in an eco-friendly vehicle by securing as much space as possible for a battery to be mounted in the vehicle, and ultimately improving productability of the vehicle by securing sufficient safety and durability from a collision accident of the vehicle.

According to an exemplary embodiment of the present disclosure, a battery mounting structure for a vehicle may include: a case having a first internal member disposed to be spaced parallel to an upper side of a lower panel and a second internal member disposed perpendicular to the first internal member, and configured to accommodate a plurality of battery modules therein using the first internal member and the second internal member; and an outer side member provided in a shape that protrudes toward the outside on an outer side of the case. The battery modules may be disposed with a stacking direction of battery cells parallel to a longitudinal direction of the first internal member.

The outer side of the case may include straight side portions formed in a straight line on both sides of the case in parallel with the second internal member, and bending portions which connect both ends of the two straight side portions and include at least a partially bent portion, and the outer side member may be provided in a shape that protrudes from the straight side portions toward the outside of the case. The battery module may be disposed such that both ends thereof in a direction perpendicular to the stacking direction of the battery cells are fixed to the first internal member and at least one of both ends in the stacking direction of the battery cells is supported by the second internal member.

The first internal member may be made of beams having a rectangular cross section with a plurality of closed spaces formed therein; and fixing flanges of both ends of the battery module may be fixed to an upper side surface of the first internal member. Side wall portions facing the battery cells may be provided perpendicular to the lower panel of the case to support surfaces of the battery cells located at the ends in the stacking direction of the battery cells of the battery module in a flat manner, and a height in which the side wall portions of the second internal member protrude upward from the lower panel may be formed to be ⅔ or more of a height of the battery module.

The battery module may omit an end plate, and the side wall portions of the second internal member may be configured to function as the end plate of the battery module. The second internal member may have side wall portions for supporting surfaces of the battery cells disposed at the ends in the stacking direction of the battery cells of the battery module provided on both sides thereof, and an insertion space for inserting another object may be provided between the two side wall portions.

A battery controller may be inserted into the insertion space of the second internal member, and a connector of the battery controller may be disposed toward an upper side of the second internal member. The battery controller may be fixed using an upper side surface of the second internal member.

An independent end plate fixed to the case may be provided to support the surface of the battery cell on the side that is not supported by the second internal member among both ends in the stacking direction of the battery cells of the battery module. The independent end plate may integrally include an inclined bracket that forms a supporting force to support surfaces of the battery cells, as a cross section inclined with respect to the surfaces of the battery cells.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION

Figure 1:
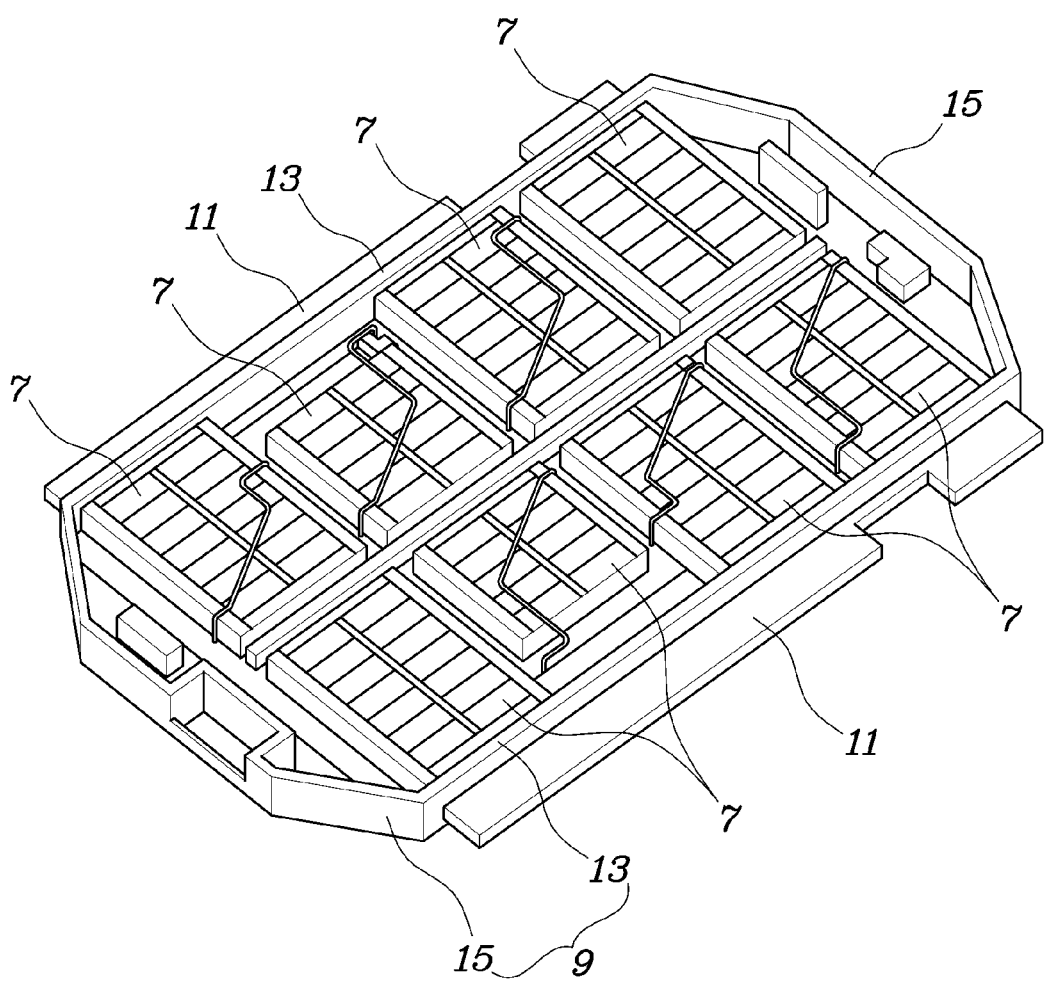
FIG. 1 is a view illustrating a battery mounting structure for a vehicle according to the present disclosure.
Figure 2:
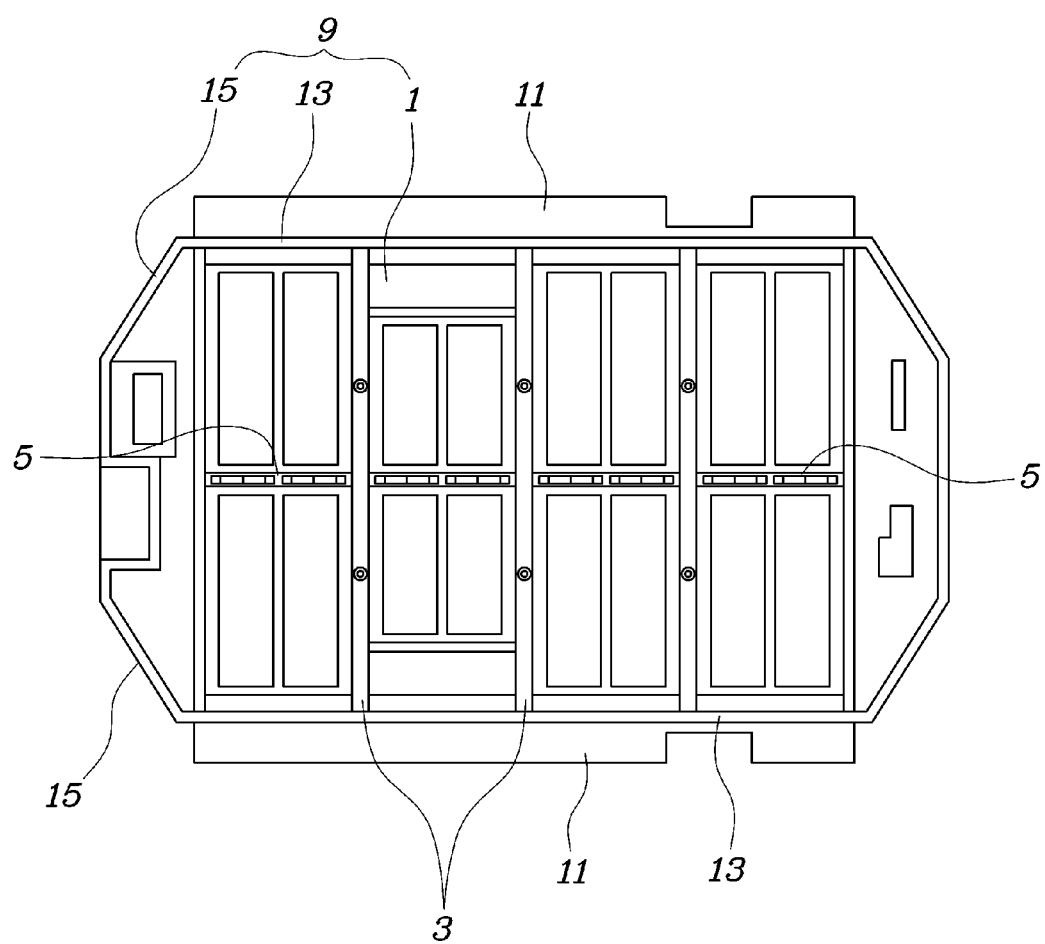
FIG. 2 is a view illustrating a case of FIG. 1 according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIGS. 1 to 4, a battery mounting structure for a vehicle according to the present disclosure may include a case 9 having a first internal member 3 disposed to be spaced parallel to an upper side of a lower panel 1 and a second internal member 5 disposed perpendicular to the first internal member 3, and configured to accommodate a plurality of battery modules 7 therein using the first internal member 3 and the second internal member 5; and an outer side member 11 provided in a shape that protrudes toward the outside on an outer side of the case 9.

FIG. 1 illustrates a state in which the battery modules 7 are all mounted in the case 9 by applying the present disclosure observed from above, and a cover (not illustrated) may be coupled to an upper side of FIG. 1 and may be then mounted on the vehicle. The outer side of the case 9 includes straight side portions 13 formed in a straight line (e.g., linearly) on both sides of the case 9 in parallel with the second internal member 5, and bending portions 15 which connect both ends of the two straight side portions 13 and include at least a partially bent portion. The lower panel 1 may be installed to block lower side surfaces of the straight side portions 13 and the bending portions 15 and may be mounted on the vehicle in a state in which the battery modules 7 are mounted in a space formed by the straight side portions 13, the bending portions 15, and the lower panel 1 and the cover is covered.

The outer side member 11 may be provided in a shape that protrudes from the straight side portions 13 toward the outside of the case 9. Therefore, in the case of collision accident of the vehicle or the like, when an impact force acts on the outer side member 11 of the case 9, a structure capable of dispersing and supporting the impact force by the first internal members 3 inside the case 9 is formed, thereby making it possible to more safely protect the battery modules mounted therein.

Figure 3:
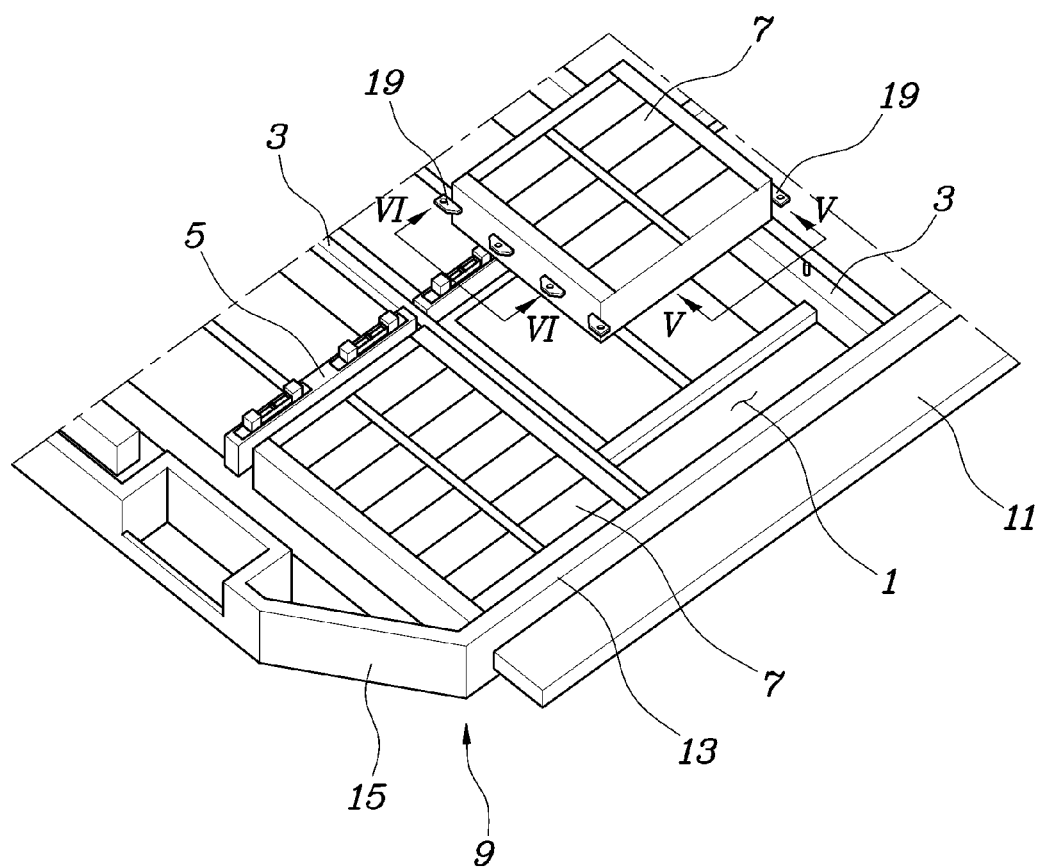
FIG. 3 is a view illustrating a process of mounting a battery module in the case according to the present disclosure.
Figure 4:
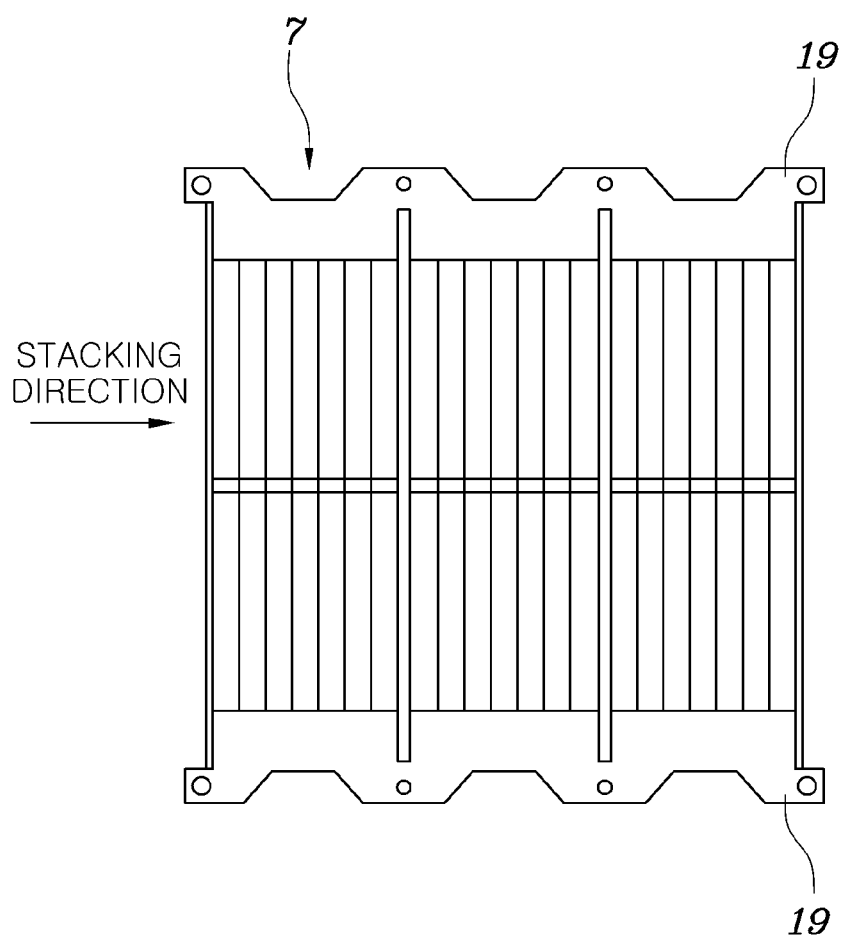
FIG. 4 is a plan view of the battery module of FIG. 3 observed from above according to the present disclosure.

The battery module 7 may be formed by stacking a plurality of battery cells 17 in one direction, as illustrated in FIG. 4. Referring to FIG. 3, the battery module 7 may be disposed such that the stacking direction of the battery cells 17 is parallel to a longitudinal direction of the first internal member 3. Both ends of the battery module 7 in a direction perpendicular to the stacking direction of the battery cells 17 may be fixed to the first internal member 3.

Figure 5:
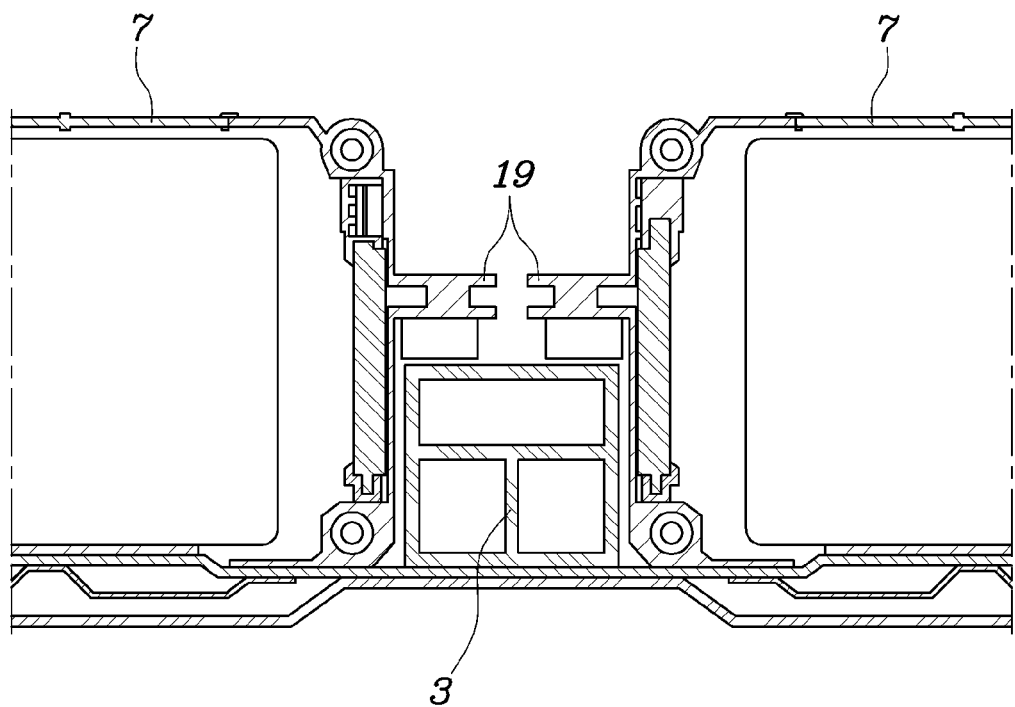
FIG. 5 is a cross-sectional view taken along line V-V for a state in which the battery module is disposed in the case of FIG. 3.

As illustrated in FIG. 5, the first internal member 3 may be formed of beams having a rectangular cross section with a plurality of closed spaces formed therein; and fixing flanges 19 of both ends of the battery module 7 may be fixed to an upper side surface of the first internal member 3. For example, fixing bolts for fixing the fixing flanges 19 of the battery module 7 protrude on the upper side surface of the first internal member 3, and the fixing flanges 19 may be inserted into the fixing bolts and may be locked with nuts. The fixing bolts may penetrate the fixing flanges 19 and may be fastened to the first internal member 3, or a combination of these fastening structures is used, thereby making it possible to fix the battery modules 7 to the first internal member 3. Notably, the present disclosure is not limited to fixing bolts and nut and other fastening mechanisms may be used.

In addition, the battery module 7 may be disposed such that at least one of both ends in the stacking direction of the battery cells 17 is supported by the second internal member 5. In other words, the battery module 7 may omit an end plate, and the second internal member 5 may operate as the end plate of the battery module 7. As a result, since the battery cells may be further configured in place of the end plate provided in the conventional battery module 7, a battery system having a larger energy storage capacity in the same space may be constructed.

Particularly, the end plate is a part installed to surround both ends of the stacking direction of the battery cells 17 forming the battery module 7 in the conventional general battery module 7 to suppress a swelling phenomenon of the battery cells 17 and contribute to securing structural rigidity of the battery module 7. According to the present disclosure, since the second internal member 5 is configured to be used in place of the function of the end plate, it may be possible to prevent such an end plate from being installed in the battery module 7 used in the present invention.

Figure 6:
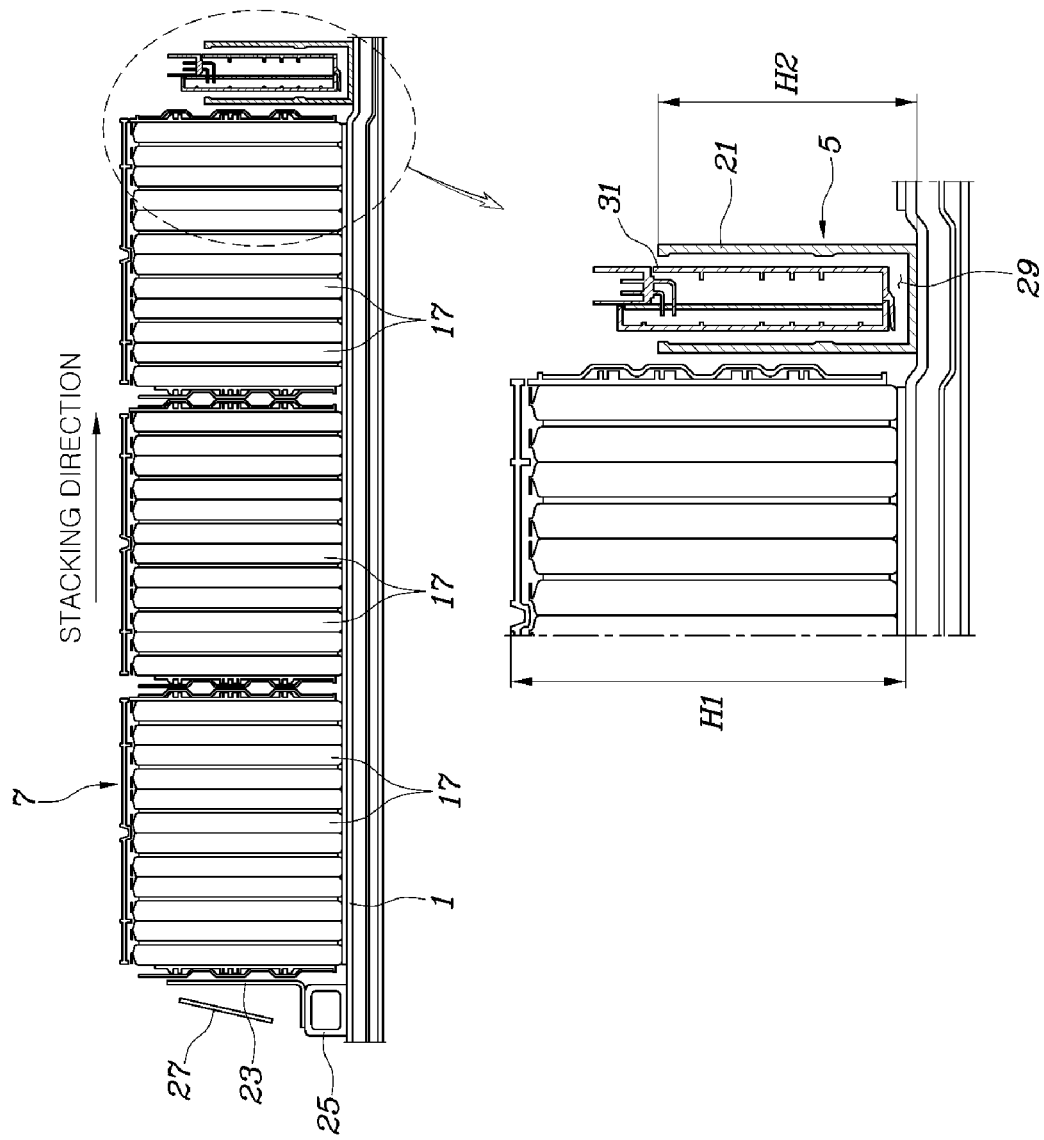
FIG. 6 is a cross-sectional view taken along line VI-VI for a state in which the battery module is disposed in the case of FIG. 3 according to the present disclosure.
Figure 7:
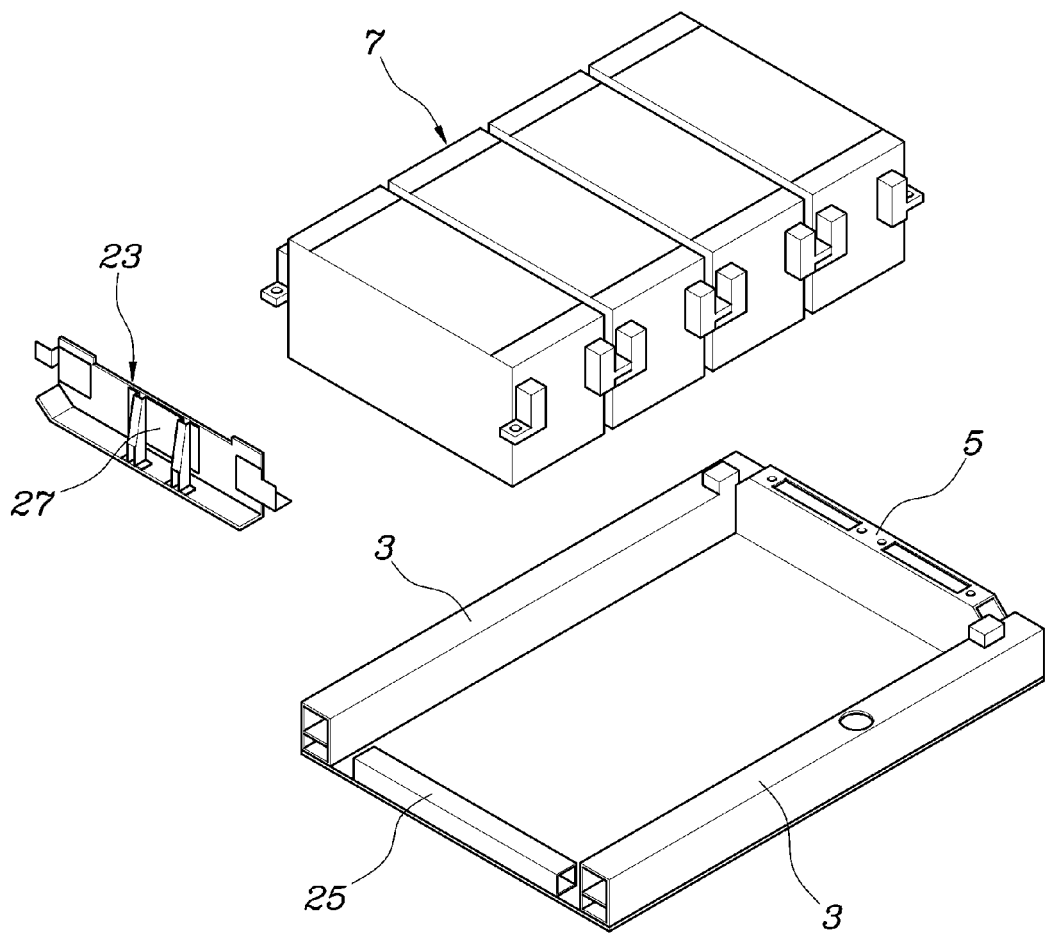
FIG. 7 is a view three-dimensionally illustrating a structure in which the battery module is mounted by extracting only a portion indicated by line VI-VI from FIG. 3 according to the present disclosure.
Figure 8:
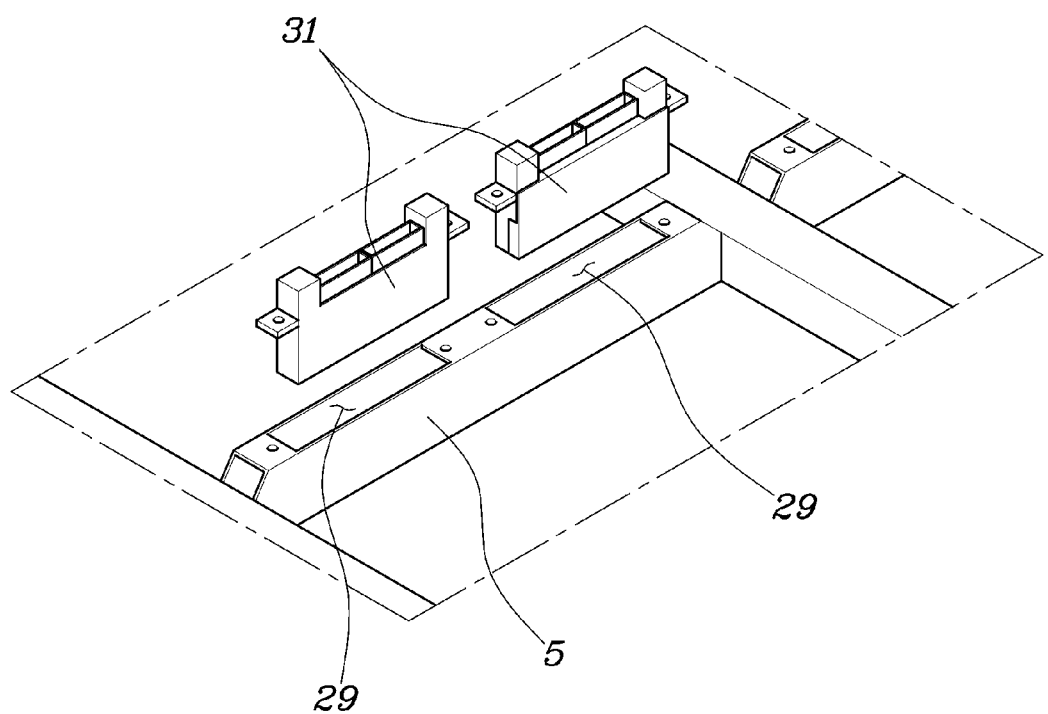
FIG. 8 is a view describing that a battery controller is installed in an insertion space of a second internal member according to the present disclosure.

Referring to FIGS. 6 to 8, side wall portions 21 facing the battery cells 17 may be provided perpendicular to the lower panel 1 of the case 9 to support surfaces of the battery cells 17 disposed at the ends in the stacking direction of the battery cells 17 of the battery module 7 in a flat manner, and as a result, the second internal member 5 may be used in place of the function of the end plate of the battery module 7 as described above. In order for the side wall portions 21 of the second internal member 5 to replace the function of the end plate as described above, a height H2 in which the side wall portion 21 protrudes upward from the lower panel 1 may be formed to be about ⅔ or more of a height H1 of the battery module 7.

As described above, the battery modules 7 mounted in the case 9 may be installed so that a first side thereof is supported by the second internal member 5 performing the function of the end plate, and may be installed so that a second side thereof is supported on an inner side surface of the straight side portion 13 of the case 9, thereby making it possible to provide the supporting force and structural rigidity capable of suppressing the swelling phenomenon of the battery cells 17 to the battery modules 7. However, referring to FIG. 1, as described above, a first side of the battery module 7 may be supported by the second internal member 5, but a second side thereof may not be supported by the straight side portion 13 of the case 9.

According to the present disclosure, in preparation for such a case, to support the surface of the battery cell 17 on the side that is not supported by the second internal member 5 among both ends in the stacking direction of the battery cells 17 of the battery module 7, an independent end plate 23 fixed to the case 9 may be provided, and an assembly structure of such a battery module 7 is specifically illustrated in FIGS. 6 and 7.

The independent end plate 23, which is a separate component from the battery module 7, may be fixed to an upper side of an auxiliary support bar 25, which is fixed to the upper side of the lower panel 1, as illustrated, to be installed to support the battery module 7, and may also be directly fixed to the lower panel 1 by omitting the auxiliary support bar 25. In particular, the independent end plate 23 may integrally include an inclined bracket 27 that forms a supporting force supporting the surfaces of the battery cells 17 as a cross section inclined with respect to the surfaces of the battery cells 17, thereby more firmly supporting the battery module 7.

The second internal member 5 is a structure in which the side wall portions 21 for supporting the surfaces of the battery cell 17 disposed at the ends in the stacking direction of the battery cells 17 of the battery module 7 are provided on both sides, and an insertion space 29 for inserting another object may be provided between the two side wall portions 21. A battery controller 31 may be inserted into the insertion space 29 of the second internal member 5 as illustrated in FIG. 8, a connector of the battery controller 31 may be disposed toward the upper side of the second internal member 5, and the battery controller 31 may be fixed with a bolt or the like using the upper side surface of the second internal member 5.

Therefore, the connection and disconnection of the connector for electrically connecting or disconnecting the battery controller 31 mounted as above to or from the outside may be formed more easily, and by configuring the battery controller 31 to be inserted into the second internal member 5 as described above, the space that had to be provided separately for installing the conventional battery controller 31 may be diverted to other purposes, such as further adding the battery cells 17 or using the space to secure an interior space of a vehicle body.

As described above, according to the present disclosure, by increasing an energy storage capacity of the battery by additionally installing the battery cells 17 in the space secured by removing the end plate from the battery module 7 and more efficiently disposing the mounting space of the battery controller 31, a mileage of the vehicle may be increased, and a ground clearance and an interior space of the vehicle may be more appropriately secured and configured, thereby substantially improving the productability of the vehicle.

According to the present disclosure, it may be possible to secure safety and durability from the collision accident of the vehicle, it may be possible to prevent ignition or explosion due to swelling of the battery cells, and it may be possible to reduce the weight and cost of the battery system by reducing the number of parts of the battery module, thereby increasing the energy storage capacity of the battery.

Further, it may be possible to additionally mount the battery cells due to an efficient arrangement of the space for mounting the battery controller, and ultimately, it may be possible to properly secure the ground clearance and the interior space of the vehicle, thereby improving the productability of the vehicle.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims.

What is claimed is:

1. A battery mounting structure for a vehicle, comprising:
   a case having a first internal member disposed to be spaced parallel to an upper side of a lower panel of the case and a second internal member disposed perpendicular to the first internal member, and configured to accommodate a plurality of battery modules therein using the first internal member and the second internal member;
   wherein the plurality of battery modules are disposed such that a stacking direction of battery cells is parallel to a longitudinal direction of the first internal member;
   wherein an outer side of the case includes straight side portions formed linearly on both sides of the case in parallel with the second internal member;
   wherein an outer side member is provided in a shape that protrudes from each of the straight side portions toward the outside of the case;
   wherein the outer side member extends in a direction perpendicular to the stacking direction of the battery cells to an extent that the outer side member at least overlaps the first internal member when at least viewed from a side of the battery mounting structure;
   wherein a battery module is disposed with both ends in the direction perpendicular to the stacking direction of the battery cells fixed to the first internal member and wherein at least one of both ends in the stacking direction of the battery cells is supported by the second internal member;
   wherein the second internal member has side wall portions for supporting surfaces of the battery cells disposed at the ends in the stacking direction of the battery cells of the battery module provided on both sides thereof, and an insertion space for inserting another object is disposed between the two side wall portions;
   wherein a battery controller is inserted into the insertion space of the second internal member, and a connector of the battery controller is disposed toward an upper side of the second internal member; and
   wherein the battery controller is fixed using an upper side surface of the second internal member.

2. The battery mounting structure for a vehicle of claim 1, wherein the outer side of the case further includes bending portions which connect both ends of the two straight side portions and include at least a partially bent portion.

3. The battery mounting structure for a vehicle of claim 1, wherein
   the first internal member is formed of beams having a rectangular cross section with a plurality of closed spaces formed therein; and
   fixing flanges of both ends of the battery module are fixed to an upper side surface of the first internal member.

4. The battery mounting structure for a vehicle of claim 1, wherein side wall portions facing the battery cells are provided perpendicular to the lower panel of the case to support surfaces of the battery cells disposed at the ends in the stacking direction of the battery cells of the battery module in a flat manner, and a height in which the side wall portions of the second internal member protrude upward from the lower panel is formed to be about ⅔ or more of a height of the battery module.

5. The battery mounting structure for a vehicle of claim 4, wherein the side wall portions of the second internal member operates as an end plate of the battery module.

6. The battery mounting structure for a vehicle of claim 1, wherein an independent end plate fixed to the case is provided to support the surface of a battery cell on a side that is not supported by the second internal member among both ends in the stacking direction of the battery cells of the battery module, and the independent end plate integrally includes an inclined bracket that forms a supporting force supporting surfaces of the battery cells, as a cross section inclined with respect to the surfaces of the battery cells.

* * * * *